(12) United States Patent
Hsieh

(10) Patent No.: US 7,281,612 B2
(45) Date of Patent: Oct. 16, 2007

(54) BRAKE STRUCTURE FOR A ROLL-UP DOOR

(75) Inventor: Chung-Jung Hsieh, Taipei Hsien (TW)

(73) Assignee: Anchuan Corporation, Taipei Hsien (TW)

( * ) Notice: Subject to any disclaimer, the term of this patent is extended or adjusted under 35 U.S.C. 154(b) by 535 days.

(21) Appl. No.: 10/920,370

(22) Filed: Aug. 18, 2004

(65) Prior Publication Data

US 2005/0039994 A1 Feb. 24, 2005

(30) Foreign Application Priority Data

Aug. 21, 2003 (TW) .............................. 92215243 U

(51) Int. Cl.
*F16D 65/36* (2006.01)
(52) U.S. Cl. ...................... 188/156; 188/161; 188/163; 254/378
(58) Field of Classification Search ................ 188/156, 188/157, 161, 163, 164, 74, 78; 254/366, 254/378

See application file for complete search history.

(56) References Cited

U.S. PATENT DOCUMENTS

| | | | | |
|---|---|---|---|---|
| 1,853,295 A | * | 4/1932 | Bendix | .......................... 188/138 |
| 1,867,645 A | * | 7/1932 | Apple | .......................... 188/164 |
| 1,958,608 A | * | 5/1934 | Burr | .............................. 188/138 |
| 2,939,551 A | * | 6/1960 | Hansen | ......................... 188/171 |
| 3,085,662 A | * | 4/1963 | Binder et al. | ................. 188/171 |
| 5,203,392 A | | 4/1993 | Shea | |
| 5,386,891 A | | 2/1995 | Shea | |
| 6,460,828 B1 | * | 10/2002 | Gersemsky et al. | ......... 254/267 |

* cited by examiner

*Primary Examiner*—Melody M. Burch
(74) *Attorney, Agent, or Firm*—Rosenberg, Klein & Lee

(57) ABSTRACT

A brake structure for a roll-up door includes a brake drum fixed to a transmission shaft of a speed reducer. The brake drum receives a pair of brake shoes in opposite inner sides thereof. The brake shoes are pivotably connected to each other at an end of each brake shoe. A linking resilient member is connected between the free ends of the brake shoes. A brake pad is attached to a surface of each brake shoe facing the inner surface of the brake drum. A controlling lever is disposed at the top of the speed reducer corresponding to the free ends of the brake shoes. One end of the controlling lever is connected to an end of a fixing resilient member. The other end of the fixing resilient member is connected to a moving iron of a first solenoid. A clasping block is connected to the moving iron of the first solenoid. The other end of the controlling lever is connected to a moving iron of a second solenoid. A controlling block is disposed at the controlling lever between the free ends of the brake shoes and in contact to the free ends of the brake shoes. A brake control solenoid is disposed at the top of the speed reducer. The brake control solenoid is connected to a power supply with capacitance character. A moving iron of the brake control solenoid is connected to a connecting rod mechanism. The clasping block is connected to the connecting rod mechanism.

17 Claims, 8 Drawing Sheets

BRAKE STRUCTURE FOR A ROLL-UP DOOR

BACKGROUND OF THE INVENTION

1. Field of the Invention

The present invention relates to a brake structure for a roll-up door, and particularly to a brake structure which is released to close a doorway through a roll-up door when fire and power cut take place in a building.

2. Prior Art

It is important to prevent fire from taking place at a building. However, fire still occasionally takes place. So it is also important to prevent fire from spreading when fire takes place. Iron roll-up doors are widely used in public occasions as fireproofing separation thereby preventing fire from spreading during fire.

Referring to FIGS. 1A and 1B, a conventional brake structure for an iron roll-up door includes a brake drum 12 attached in a speed reducer 10. A transmission shaft 14 of the speed reducer 10 extends through and is connected to the brake drum 12, whereby the brake drum 12 and the transmission shaft 14 rotate synchronally. A pair of brake shoes 16 is received in opposite inner sides of the brake drum 12 respectively. The brake shoes 16 are pivotably connected with each other at one end of each brake shoe 16. A spring 17 is connected between two free ends of the brake shoes 16. A brake pad 18 is attached to a surface of each brake shoe 16 towards the inner surface of the brake drum 12. An alternating current (AC) solenoid 20 is disposed at one side of the top of the speed reducer 10. A moving iron 22 of the solenoid 20 is connected to an end of a controlling lever 24. The other end of the controlling lever 24 is connected to an end of a spring 26. The other end of the spring 26 is connected to the top of the speed reducer 10. A controlling block 28 is disposed at the controlling lever 24 corresponding to the free ends of the brake shoes 16. Opposite side surfaces of the controlling block 28 are in contact to the free ends of the brake shoes 16 respectively. A motor 30 is disposed at the top of the speed reducer 10. A rotation shaft 32 of the motor 30 is connected to and synchronally rotates with the transmission shaft 14 of the speed reducer 10.

The controlling block 28 is actuated to outwards push the free ends of the brake shoes 16 whereby the brake pads 18 abut against the inner surface of the brake drum 12 to generate a friction force to stop rotation of the transmission shaft 14 of the speed reducer 10 thereby being at a brake state. When fire takes place and a smoke alarm senses smother or a fire alarm is turned on to emit fire signals, electricity is supplied to the AC solenoid 20 of the iron roll-up door brake structure to generate a magnetic force for attracting the moving iron 22 to move towards the AC solenoid 20. Therefore, the controlling lever 24 is moved correspondingly to rotate the controlling block 28 (as shown in arrow) and so the free ends of the brake shoes 16 are not pushed by the controlling block 28, whereby the brake shoes 16 returns to a free state at which the brake pads 18 do not contact the brake drum 12 and so are released from the brake state. Thus, the transmission shaft 14 is rotatable and the iron roll-up door falls to close doorway due to gravity thereby preventing fire from spreading to other places.

As mentioned above, when fire takes place, it is required to supply electricity to the AC solenoid 20 for releasing the iron roll-up door from the brake state. However, when no electricity can be supplied to the AC solenoid 20, such as when fire and power cut take place at the same time, the iron roll-up door cannot be released from the brake state and so cannot prevent fire from spreading.

It is required to improve the conventional brake structure for a roll-up door.

SUMMARY OF THE INVENTION

Accordingly, an object of the present invention is to provide a brake structure for a roll-up door which can be released from a brake state to close doorway when fire and power cut take place thereby preventing fire from spreading.

To achieve the above-mentioned object, a brake structure for a roll-up door in accordance with the present invention includes a brake drum for being fixed to a transmission shaft of a speed reducer. The brake drum receives a pair of brake shoes in opposite inner sides thereof. The brake shoes are pivotably connected to each other at an end of each brake shoe. A linking resilient member is connected between the free ends of the brake shoes. A brake pad is attached to a surface of each brake shoe facing the inner surface of the brake drum. A controlling lever for being disposed at the top of the speed reducer corresponding to the free ends of the brake shoes has one end connected to an end of a fixing resilient member. The other end of the fixing resilient member is connected to a moving iron of a first solenoid. A clasping block is connected to the moving iron of the first solenoid. The other end of the controlling lever is connected to a moving iron of a second solenoid. The first solenoid and the second solenoid are disposed at the top of the speed reducer. A controlling block is disposed at the controlling lever between the free ends of the brake shoes and in contact to the free ends of the brake shoes. A brake control solenoid for being disposed at the top of the speed reducer is connected to a power supply with capacitance character. A moving iron of the brake control solenoid is connected to a connecting rod mechanism. The clasping block is connected to the connecting rod mechanism.

Other objects, advantages and novel features of the present invention will be drawn from the following detailed embodiments of the present invention with attached drawings, in which:

DESCRIPTION OF THE PREFERRED EMBODIMENTS

Figure 1A:
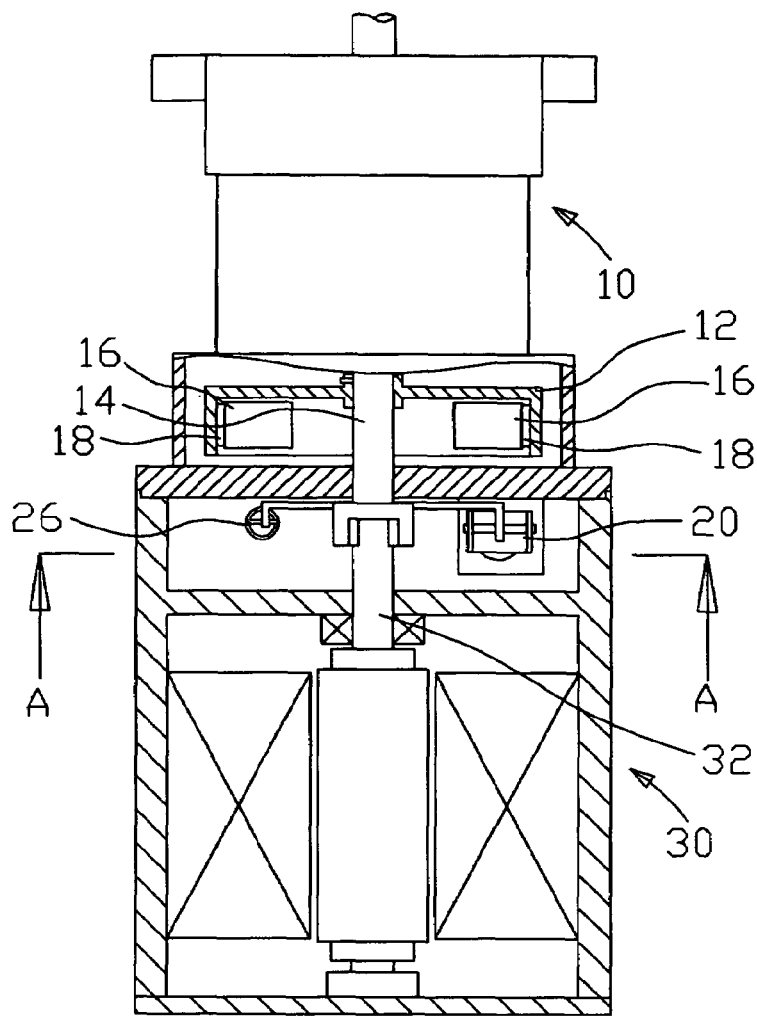
FIG. 1A is a schematic view of a conventional brake structure for a roll-up door.
Figure 1B:
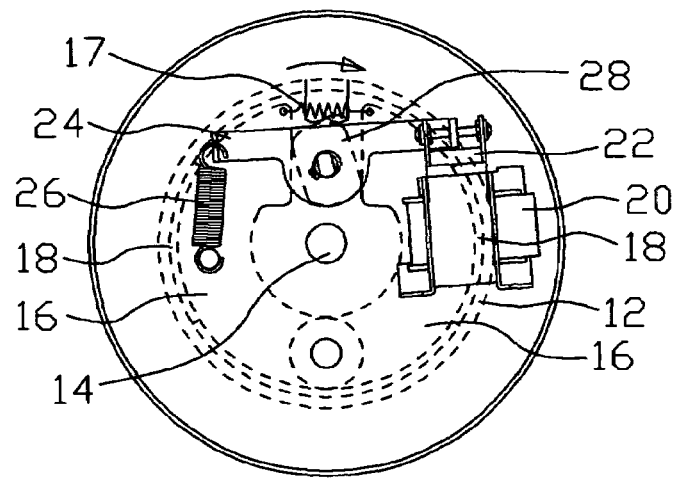
FIG. 1B is a crosssectional view taken along line A-A of FIG. 1A.
Figure 2A:
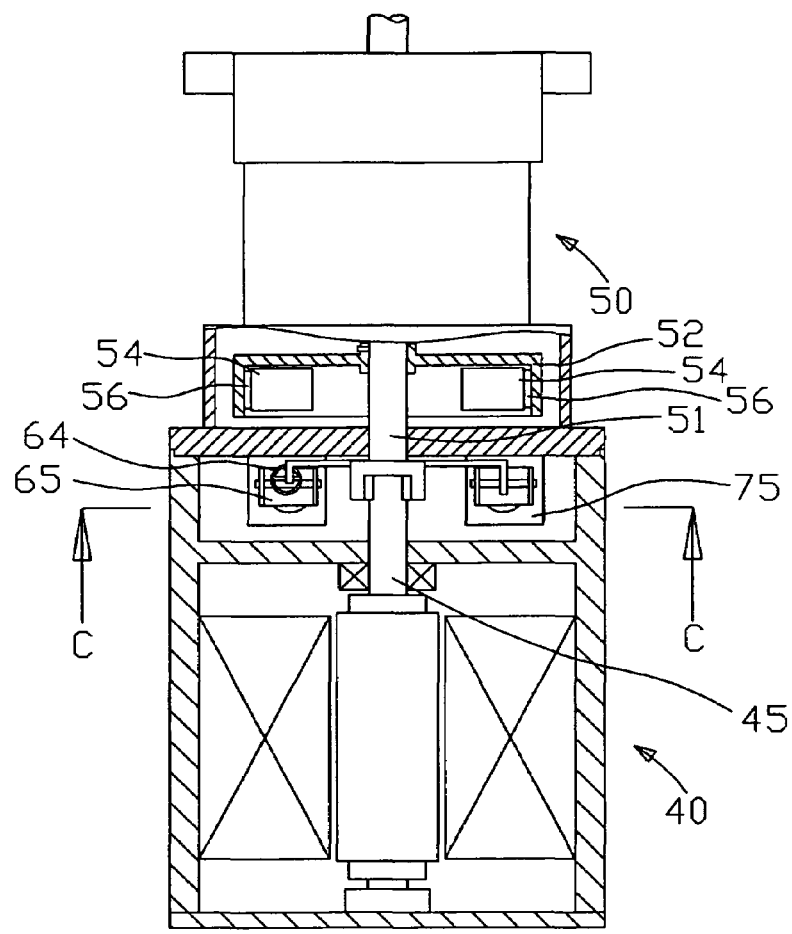
FIG. 2A is a schematic view of a brake structure for a roll-up door of the present invention.
Figure 2B:
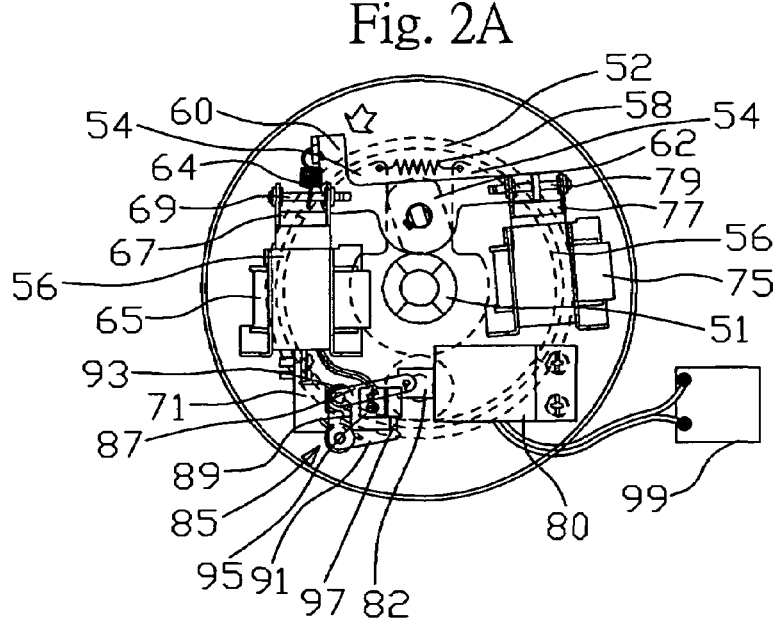
FIG. 2B is a crosssectional view taken along line C-C of FIG. 2A.

Referring to FIGS. 2A and 2B, a transmission structure of an iron roll-up door includes a motor 40 and a speed reducer 50. A rotation shaft 45 of the motor 40 is connected to a transmission shaft 51 of the speed reducer 50. The motor 40 is positioned at the top of the speed reducer 50. The rotation of the rotation shaft 45 of the motor 40 drives the transmission shaft 51 of the speed reducer 50 to rotate. The rotation of the transmission shaft 51 is decelerated through the speed reducer 50 to drive the roll-up door to open or close. A brake structure of the present invention is formed at the front of the speed reducer 50. The brake structure includes a brake drum 52. The transmission shaft 51 of the speed reducer 50 extends through and is connected to the brake drum 52 whereby the brake drum 52 and the transmission shaft 51 synchronally rotate. A pair of brake shoes 54 is received in opposite inner sides of the brake drum 52. Each brake shoe 54 is generally C-shaped and faces to each other. A brake pad 56 is formed at a surface of each brake shoe 54 facing to the inner surface of the brake drum 52. The brake shoes 54 are pivotably connected to each other at one end of each brake shoe 54. A linking resilient member 58 is connected between the free ends of the brake shoes 54 opposite the pivoted ends of the brake shoes 54. The linking resilient member 58 may be a spring, a resilient plate or the like.

A controlling lever 60 is disposed at the top of the speed reducer 50 corresponding to the free ends of the brake shoes 54. A controlling block 62 is disposed at the controlling lever 60 and locates between the free ends of the brake shoes 54; Therefore the controlling block 62 and the controlling lever 60 synchronally move. Opposite side surfaces of the controlling block 62 respectively contact the free ends of the brake shoes 54. First and second AC solenoids 65, 75 are respectively disposed at the top of the speed reducer 50 opposite the controlling lever 60. A moving iron 77 of the second solenoid 75 is fixed to an end of the controlling lever 60 through a fixing bolt 79. A moving iron 67 of the first solenoid 65 is connected to an end of a fixing resilient member 64 through another fixing bolt 69 corresponding to the other end of the controlling lever 60. The other end of the fixing resilient member 64 is connected to the other end of the controlling lever 60. The fixing resilient member 64 may be a spring, a resilient plate or the like. A clasping block 71 is disposed at the moving iron 67. The first solenoid 65 is connected with a normal close micro switch 95. The micro switch 95 has a contact 97.

A direct current (DC) brake control solenoid 80 is disposed at the top of the speed reducer 50. A moving iron 82 of the brake control solenoid 80 is connected to a connecting rod mechanism 85. The connecting rod mechanism 85 is generally n-shaped and includes a first rod 87, a second rod 89 and a third rod 91. An end of the first rod 87 is connected to the moving iron 82. The other end of the first rod 87 is connected to an end of the second rod 89. The other end of the second rod 89 is connected to an end of the third rod 91. The other end of the third rod 91 is a free end contactable the contact 97 of the micro switch 95. A fixing shaft 93 is formed at the end of the first rod 87 connected to the second rod 89. The fixing shaft 93 is located below the first rod 87 for connecting with the clasping block 71. The brake control solenoid 80 is electrically connected to a power supply 99 with capacitance character.

As shown in FIG. 2B, the brake structure of the present invention is at a brake state. The clasping block 71 is connected to the fixing shaft 93. Therefore, the fixing resilient member 64 is stretched to force the controlling lever 60 to rotate. Thus, the controlling block 62 rotates with the controlling lever 60 to outwards push the free ends of the brake shoes 54 whereby the brake pads 56 contact the brake drum 52 to generate a friction force to force the brake drum 52 to stop rotation. Thus, the transmission shaft 51 of the speed reducer 50 is forced to stop rotation and so is at a brake state.

Figure 3:
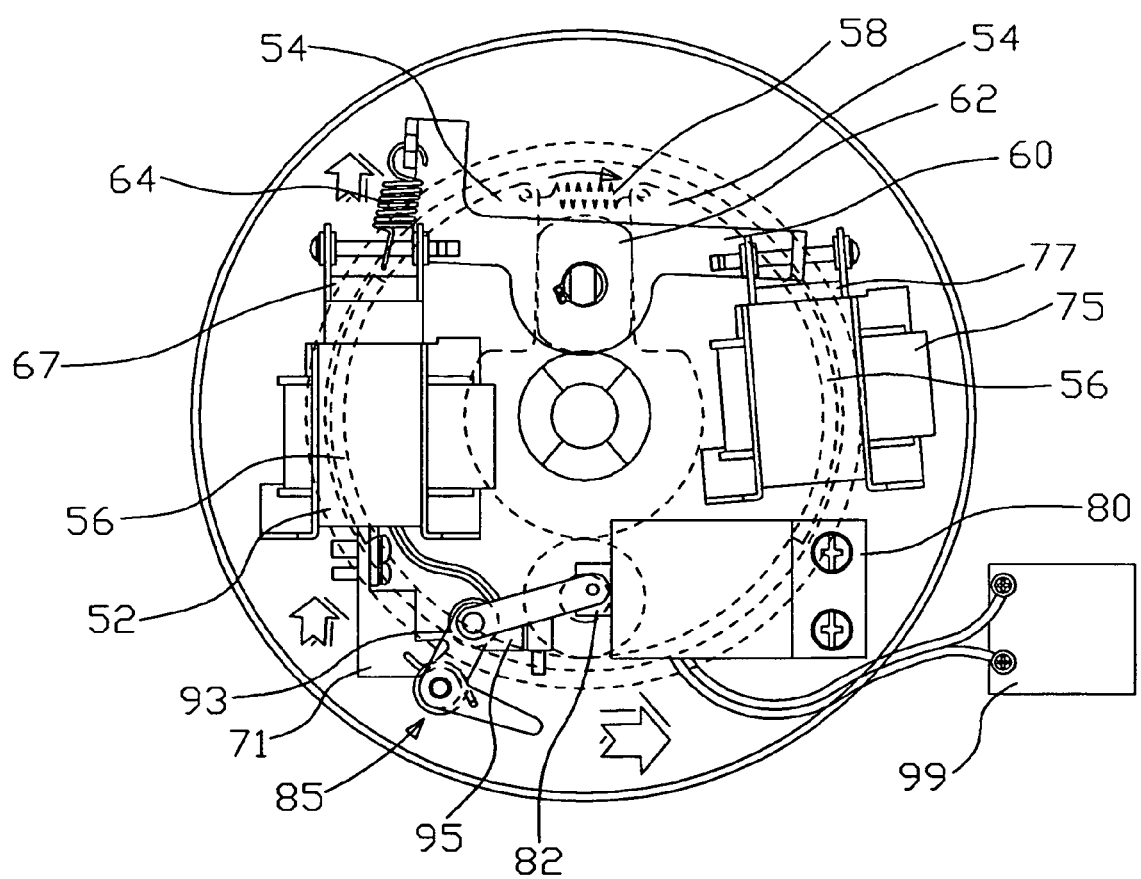
FIG. 3 is a schematic view showing the brake structure being released from a brake state.

Referring to FIG. 3, when fire takes place, and a smoke alarm senses smother or a fire alarm is pressed to emit fire signals, electricity is supplied to the second solenoid 75 to move the moving iron 77 thereby forcing the controlling lever 60 to drive the controlling block 62 to rotate. The brake shoes 54 move towards each other due to the resilience of the linking resilient member 58. Thus, the brake pads 56 do not contact the brake drum 52 and so the speed reducer 50 is released from the brake state. However, when fire and power cut take place, and so no electricity is supplied to the second solenoid 75, the power supply 99 with capacitance character can supply electricity to the brake control solenoid 80. The moving iron 82 drives the connecting rod mechanism 85 to move (as shown in arrow) thereby disconnecting the clasping block 71 from the fixing shaft 93. Thus, the moving iron 67 is moved upwards due to the resilience of the fixing resilient member 64. Therefore, the controlling lever 60 is not limited by the fixing resilient member 64 and so rotates with the controlling block 62, as shown in arrow. The brake shoes 54 move towards each other due to the resilience of the linking resilient member 58 whereby the brake pads 56 do not contact the brake drum 52 and so the speed reducer 50 is released from the brake state. The iron roll-up door falls to close the doorway due to gravity thereby preventing fire from spreading.

Since the brake structure of the present invention provides the power supply 99 with capacitance character to drive the brake control solenoid 80 for releasing the speed reducer 50 from the brake state, the brake structure is not adversely affected when fire and power cut take place. The power supply 99 supplies electricity to the brake control solenoid 80 when power cut takes place. Therefore, the problem of the conventional iron roll-up door brake structure is overcome thereby ensuring the brake structure having a function of preventing fire from spreading.

Figure 4:
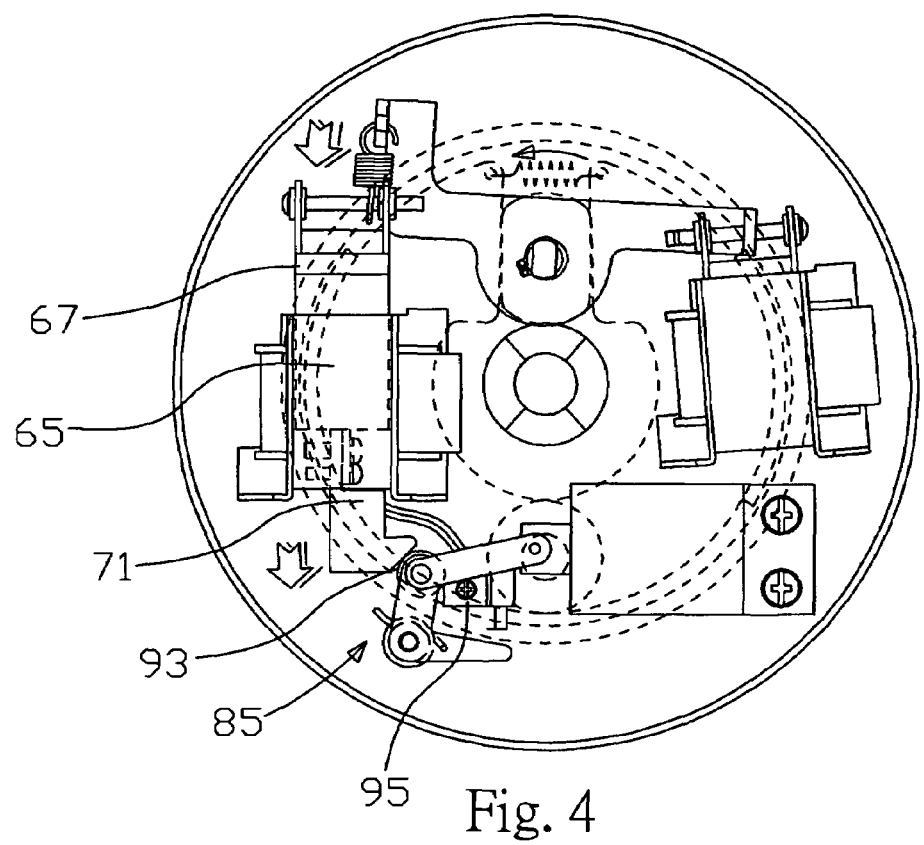
FIGS. 4-5 are schematic views showing the brake structure returning to the brake state.
Figure 5:
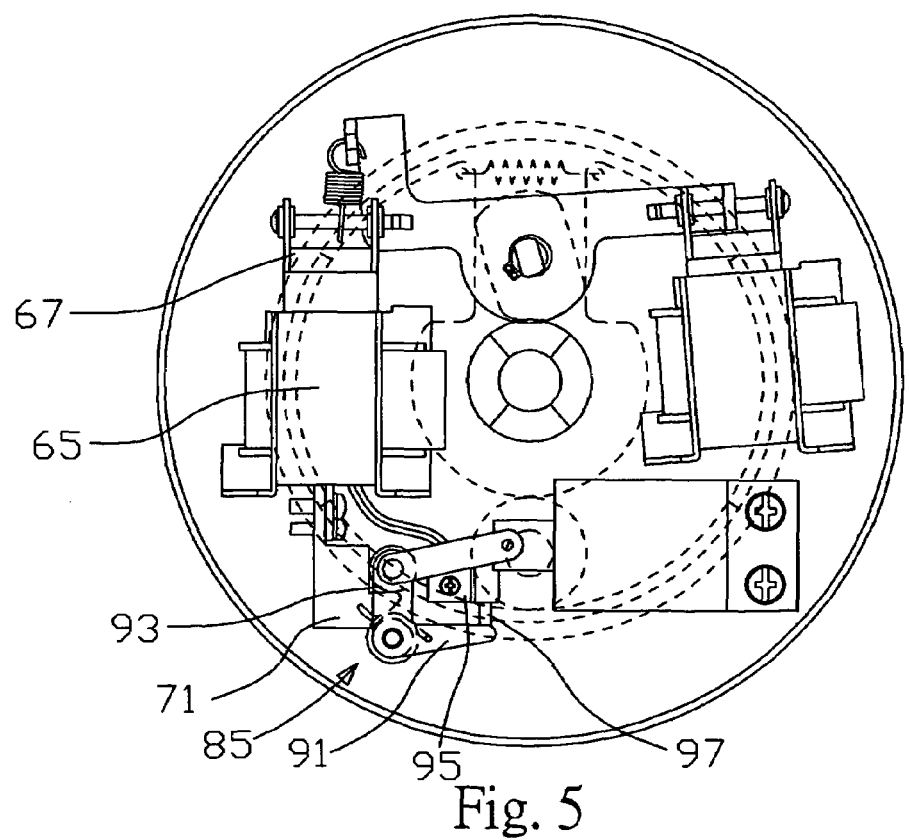

Referring to FIGS. 4 and 5, after the iron roll-up door falls to close the doorway, an open button (not shown) may be pressed to drive the motor 40 to rotate thereby opening the iron roll-up door. When the iron roll-up door is opened, the brake structure of the present invention is driven to return to the brake state. Electricity is supplied to the first solenoid 65 through the micro switch 95 to drive the moving iron 67 to move towards the connecting rod mechanism 85 (as shown in arrow of FIG. 4) thereby driving the clasping block 71 to connect with the fixing shaft 93. Therefore, the controlling block 62 rotates to return the speed reducer 50 to the brake state. Then the third rod 91 presses the contact 97 of the micro switch 95 to stop power supply to the first solenoid 65.

Figure 6:
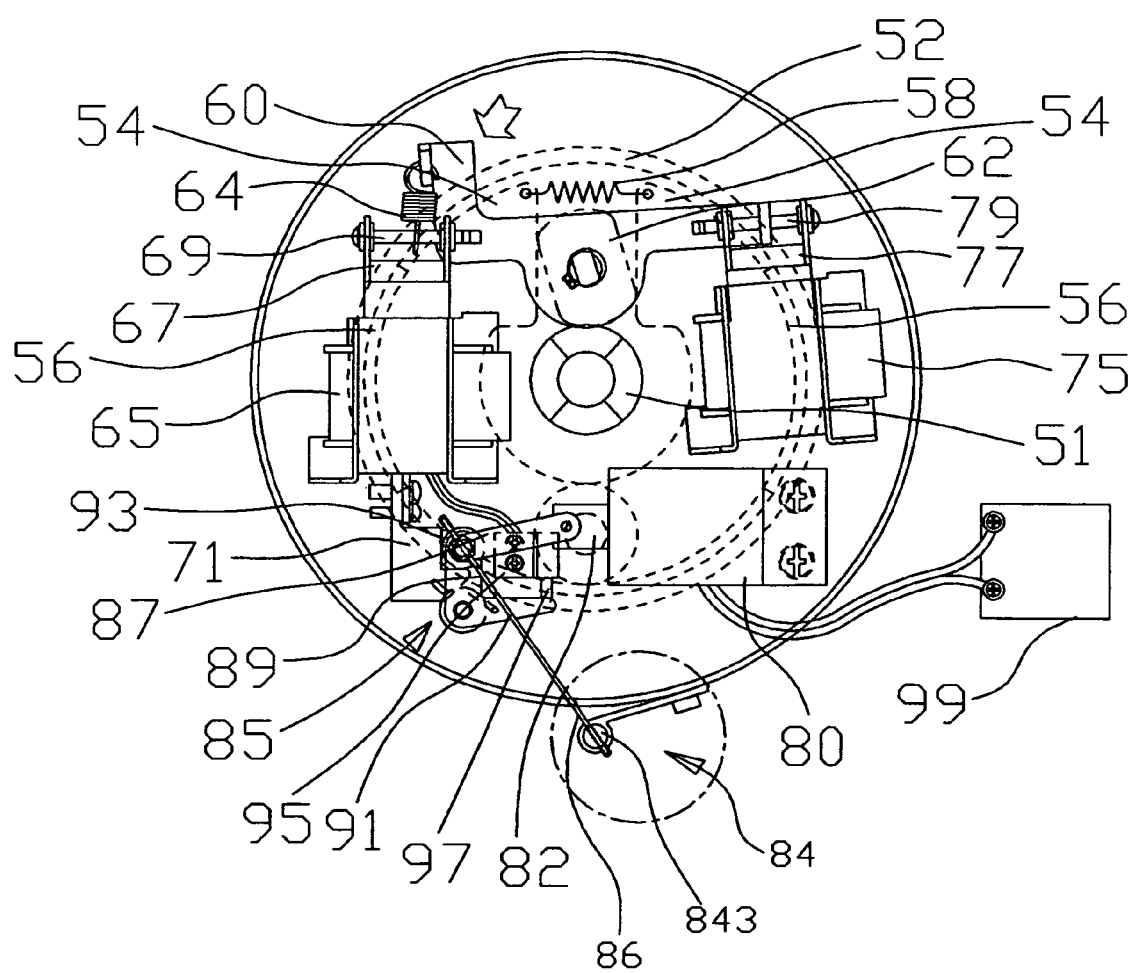
FIG. 6 is schematic view of a brake structure in accordance with a second embodiment of the present invention.
Figure 7:
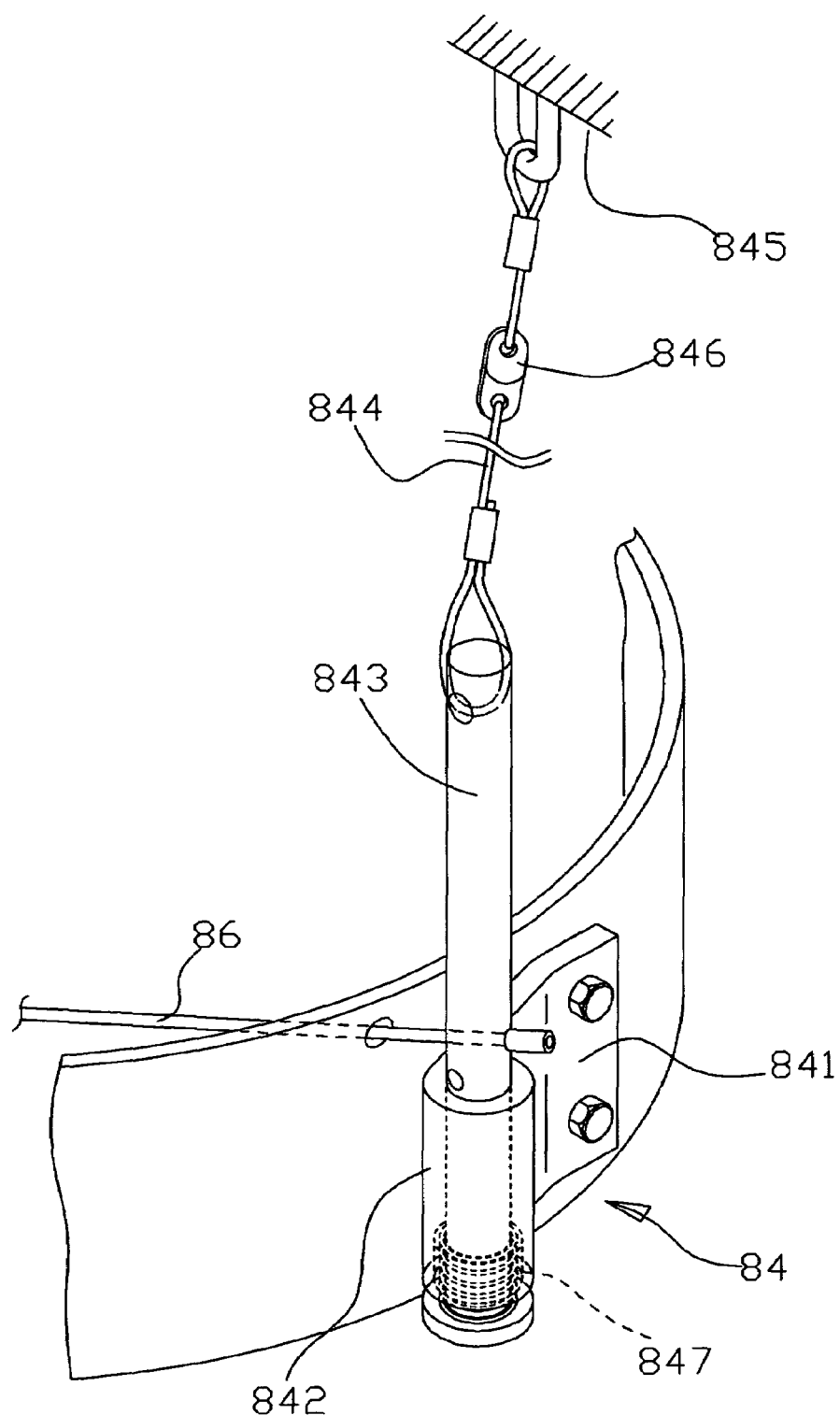
FIG. 7 is a perspective view of a brake release mechanism.
Figure 8:
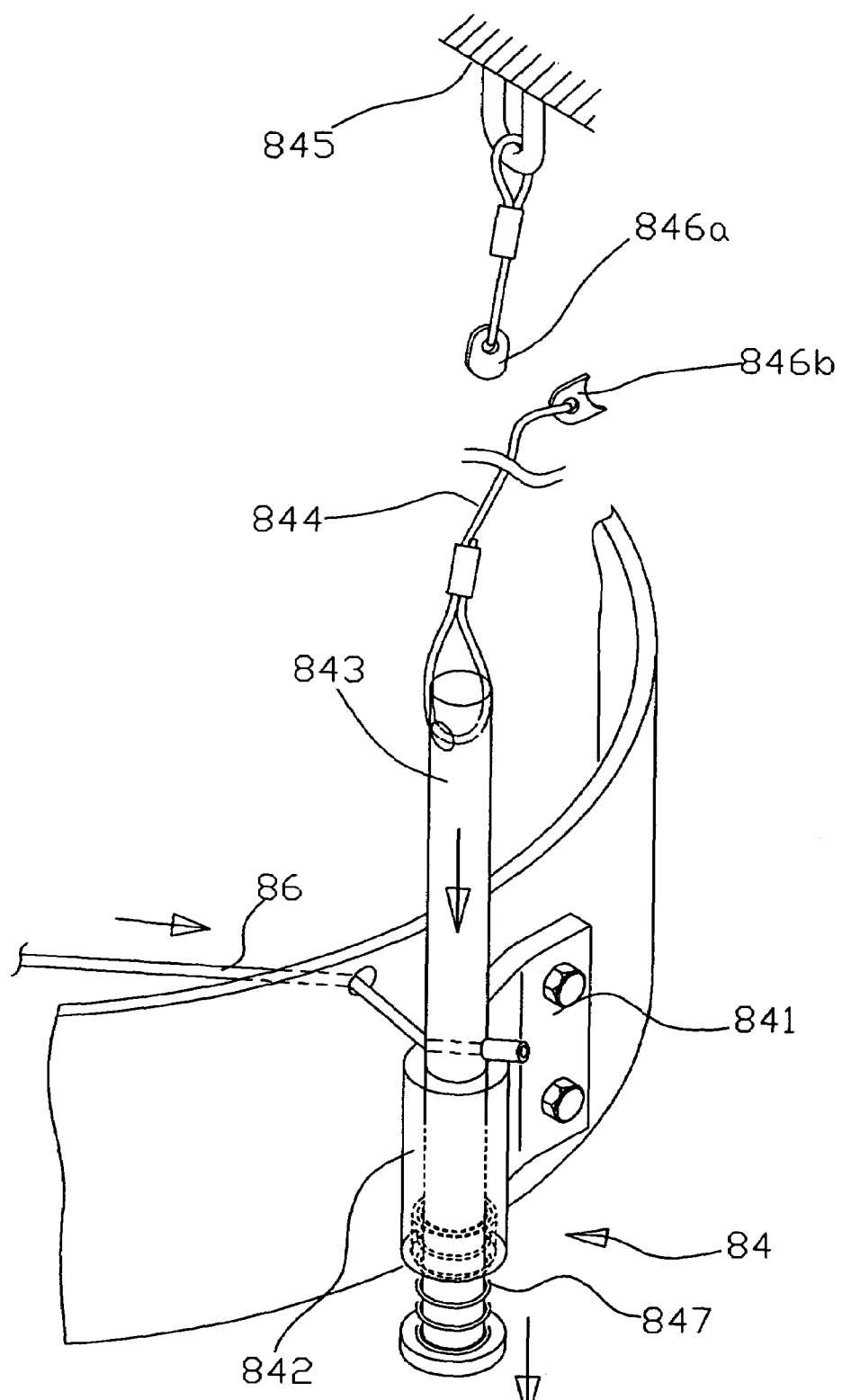
FIG. 8 is similar to FIG. 7 showing operation of the brake release mechanism.

Further referring to FIGS. 6-7, a brake structure for a roll-up door in accordance with a second embodiment of the present invention further includes a brake release mechanism 84. The brake release mechanism 84 includes a positioning seat 841 fixed to a side surface of the speed reducer 50. The positioning seat 841 has a hollow positioning sleeve 842. The positioning sleeve 842 rotatably receives an end of a linkage lever 843. The other end of the linkage lever 843 is connected to an end of a tightwire 844. The other end of the tightwire 844 is fixed to a ceiling 845 of a building (not shown). Fusible link 846 is formed at the tightwire 844 near the ceiling 845. The fusible link 846 includes two metal plates 846a, 846b connected together (as shown in FIG. 8). When temperature achieves 70-75° C., the fusible link 846 is melted and so is separated into the metal plates 846*a*, 846*b*. A spring 847 is received in the positioning sleeve 842 and is connected to the end of the linkage lever 843. When the linkage lever 843 is drawn by the tightwire 844 at a normal position, the spring 847 is stretched. A tightwire linkage member 86 has one end connected to the linkage lever 843 and the other end connected to the fixing shaft 93.

Figure 9:
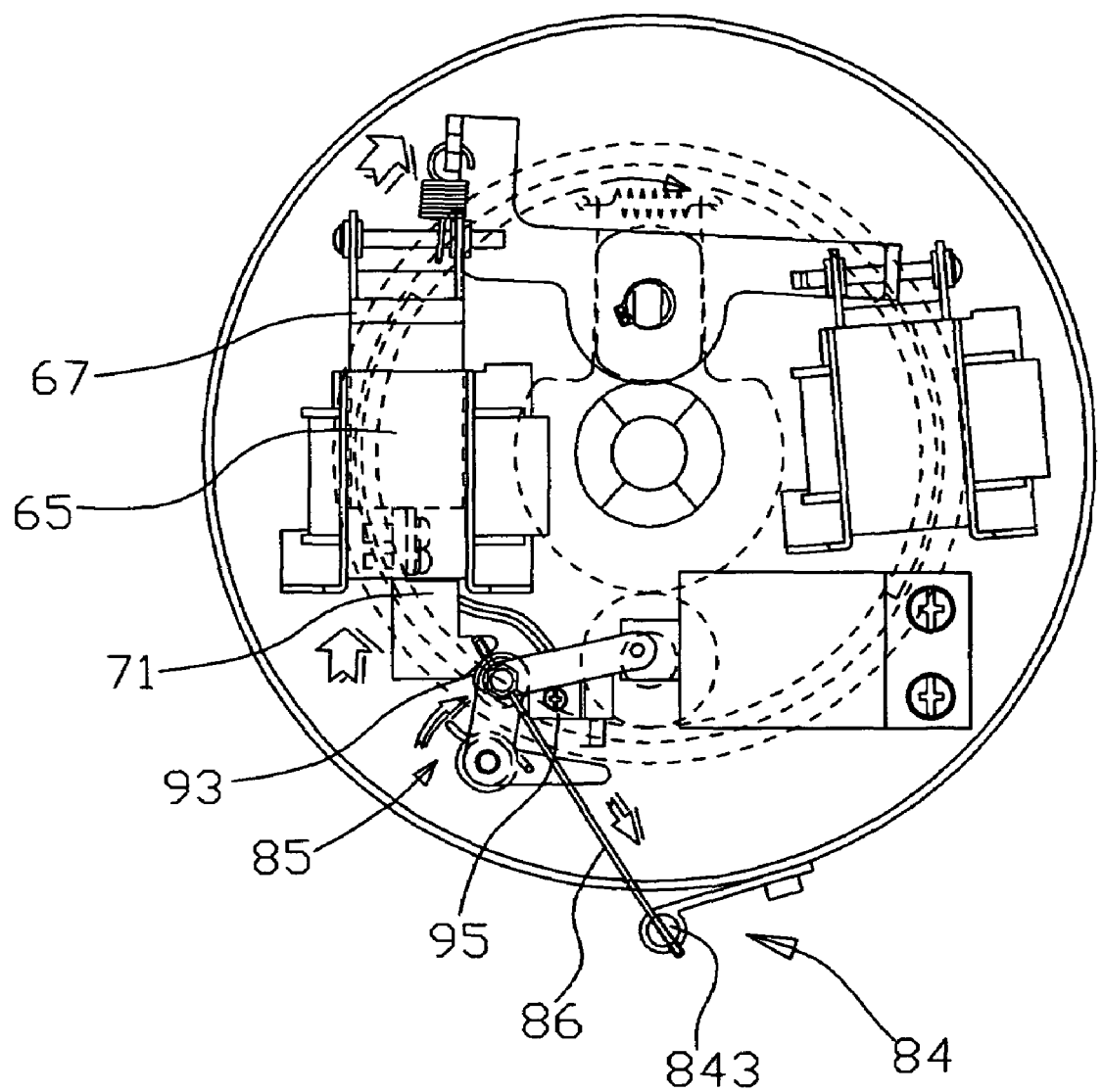
FIG. 9 is a schematic view showing the brake structure being released from a brake state.

When fire and power cut take place and the power supply 99 cannot drive the brake control solenoid 80, the brake release mechanism 84 can release the speed reducer 50 from the brake state. Since temperature of the ceiling 845 is quite high during fire, that's it is often above 70° C., the fusible link 846 is melted to separate into the metal plates 846*a*, 846*b*. The linkage lever 843 is not drawn by the tightwire 844 and so is moved downwards by the spring 847. Therefore the tightwire linkage member 86 is drawn by the linkage lever 843 to drive the fixing shaft 93 thereby disconnecting the clasping block 71 from the fixing shaft 93. Thus, the speed reducer 50 is released from the brake state (as shown in FIG. 9) and so the iron roll-up door falls to close the doorway due to gravity thereof thereby preventing fire from spreading. In other words, the result of the brake release mechanism 84 driving the fixing shaft 93 through the tightwire 844 is similar to that of the power supply 99 with capacitance character providing electricity to the brake control solenoid 80 for driving the connecting rod mechanism 85 through the moving iron 82. Both are to disconnect the clasping block 71 from the fixing shaft 93 thereby releasing the speed reducer 50 from the brake state. Thus, when fire and power cut take place and even the power supply 99 with capacitance character is wrong, the brake release mechanism 84 can achieve to close the roll-up door thereby preventing fire from spreading.

As described above, the brake structure for a roll-up door of the present invention can release the roll-up door brake structure from the brake state for closing the roll-up door thereby preventing fire from spreading, when fire and power cut take place.

It is understood that the invention may be embodied in other forms without departing from the spirit thereof. Thus, the present examples and embodiments are to be considered in all respects as illustrative and not restrictive, and the invention is not to be limited to the details given herein.

The invention claimed is:

1. A brake structure for a roll-up door, comprising a brake drum, for being fixed to a transmission shaft of a speed reducer, the brake drum receiving a pair of brake shoes in opposite inner sides thereof, the brake shoes being pivotably connected to each other at an end of each brake shoe, a linking resilient member being connected between the free ends of the brake shoes, a brake pad being attached to a surface of each brake shoe facing the inner surface of the brake drum; a controlling lever, for being disposed at the top of the speed reducer corresponding to the free ends of the brake shoes, one end of the controlling lever being connected to an end of a fixing resilient member, the other end of the fixing resilient member being connected to a moving iron of a first solenoid, a clasping block being connected to the moving iron of the first solenoid, the other end of the controlling lever being connected to a moving iron of a second solenoid, the first solenoid and the second solenoid being disposed at the top of the speed reducer; a controlling block disposed at the controlling lever between the free ends of the brake shoes and in contact to the free ends of the brake shoes; and a brake control solenoid for being disposed at the top of the speed reducer, the brake control solenoid being connected to a power supply with capacitance character, a moving iron of the brake control solenoid being connected to a connecting rod mechanism, the clasping block being connected to the connecting rod mechanism.

2. The brake structure for a roll-up door as claimed in claim 1, wherein the transmission shaft of the speed reducer is connected to a rotation shaft of a motor disposed at the top of the speed reducer.

3. The brake structure for a roll-up door as claimed in claim 1, wherein the linking resilient member is a spring.

4. The brake structure for a roll-up door as claimed in claim 1, wherein the fixing resilient member is a spring.

5. The brake structure for a roll-up door as claimed in claim 1, wherein the first solenoid is an AC solenoid.

6. The brake structure for a roll-up door as claimed in claim 1, wherein the second solenoid is an AC solenoid.

7. The brake structure for a roll-up door as claimed in claim 1, wherein the brake control solenoid is a DC solenoid.

8. The brake structure for a roll-up door as claimed in claim 1, wherein the moving iron of the first solenoid is connected to the fixing resilient member through a fixing bolt.

9. The brake structure for a roll-up door as claimed in claim 1, wherein the moving iron of the second solenoid is cotmected to the controlling lever through a fixing bolt.

10. The brake structure for a roll-up door as claimed in claim 1, wherein the first solenoid is further connected with a micro switch having a contact contactable with the connecting rod mechanism.

11. The brake structure, for a roll-up door as claimed in claim 10, wherein the micro switch is a normal close micro switch.

12. The brake structure for a roll-up door as claimed in claim 1, wherein the connecting rod mechanism comprises a first rod with one end connecting to the moving iron of the brake control solenoid and the other end having a fixing shaft for connecting with the clasping block.

13. The brake structure for a roll-up door as claimed in claim 12, wherein the end of the first rod having the fixing shaft is further connected to an end of a second rod, the other end of the second rod is connected to a third rod, the connecting rod mechanism is general n-shaped.

14. The brake structure for a roll-up door as claimed in claim 1, further comprising a brake release mechanism, wherein the brake release mechanism comprises a linkage lever for pivotably connected to a side surface of the speed reducer, an end of the linkage lever is connected to an end of a tightwire, the other end of the tightwire is fixed to a ceiling, fusible link is formed at the tightwire, the other end of the linkage lever connects a spring, the linkage lever is connected to an end of a linkage member, and the other end of the linkage member is connected to the connecting rod mechanism.

15. The brake structure for a roll-up door as claimed in claim 14, wherein the brake release mechanism comprises a positioning seat for being fixed to the side surface of the speed reducer, the positioning seat has a hollow positioning sleeve receiving one end of the linkage lever and the spring therein.

16. The brake structure for a roll-up door as claimed in claim 14, wherein the fusible link comprises two metal plates connected with each other.

17. The brake structure for a roll-up door as claimed in claim 14, wherein the linkage member is connected to a fixing shaft of the connecting rod mechanism, and the linkage member is a tightwire.

* * * * *